US012618491B2

(12) United States Patent
Steinke et al.

(10) Patent No.: US 12,618,491 B2
(45) Date of Patent: May 5, 2026

(54) MICROFLUIDIC COMPONENT WITH METAL LAYER STACK AND FLUID CONDUIT ELEMENT MADE OF ANOTHER MATERIAL BONDED WITH IT

(71) Applicant: Agilent Technologies, Inc., Santa Clara, CA (US)

(72) Inventors: Armin Steinke, Ettlingen (DE); Christian Daniel Ruf, Karlsbad (DE)

(73) Assignee: Agilent Technologies, Inc., Santa Clara, CA (US)

( * ) Notice: Subject to any disclaimer, the term of this patent is extended or adjusted under 35 U.S.C. 154(b) by 693 days.

(21) Appl. No.: 18/010,743

(22) PCT Filed: Jun. 9, 2021

(86) PCT No.: PCT/IB2021/055057
§ 371 (c)(1),
(2) Date: Dec. 15, 2022

(87) PCT Pub. No.: WO2021/255581
PCT Pub. Date: Dec. 23, 2021

(65) Prior Publication Data
US 2023/0256439 A1     Aug. 17, 2023

(30) Foreign Application Priority Data
Jun. 15, 2020     (DE) ..................... 10 2020 115 728.2

(51) Int. Cl.
*F16K 99/00* (2006.01)
*G01N 30/20* (2006.01)
(Continued)

(52) U.S. Cl.
CPC ......... *F16K 99/0013* (2013.01); *G01N 30/20* (2013.01); *B01D 15/22* (2013.01); *B01L 3/502761* (2013.01); *B01L 2200/0647* (2013.01); *B01L 2200/16* (2013.01); *B01L 2400/0421* (2013.01);
(Continued)

(58) Field of Classification Search
USPC ....................................................... 251/180
See application file for complete search history.

(56) References Cited

U.S. PATENT DOCUMENTS 3,868,970 A * 3/1975 Ayers .................... F16K 11/074
137/625.46
4,869,282 A * 9/1989 Sittler ................. F16K 99/0015
137/15.01
(Continued)

FOREIGN PATENT DOCUMENTS

DE     9209259 U1     10/1992
EP     0309596 B1     3/1993

OTHER PUBLICATIONS

PCT, et al., Notification of Transmittal of The International Search Report & Written Opinion mailed on Sep. 13, 2021 for Application No. PCT/IB2021/055057; 13 Pages.

*Primary Examiner* — Matthew W Jellett

(57) ABSTRACT

A microfluidic component for a sample separation device includes a layer body with multiple metal layer structures that are connected with each other, and an element made of a material different from the metal layer structures, which includes at least one microfluidic structure and is bonded with the layer body.

17 Claims, 2 Drawing Sheets

(51) Int. Cl.

| | |
|---|---|
| *B01D 15/22* | (2006.01) |
| *B01L 3/00* | (2006.01) |
| *G01N 27/447* | (2006.01) |
| *G01N 30/22* | (2006.01) |

(52) U.S. Cl.
CPC . *B01L 2400/0644* (2013.01); *F16K 2099/008* (2013.01); *F16K 2099/0084* (2013.01); *G01N 27/44791* (2013.01); *G01N 2030/202* (2013.01); *G01N 30/22* (2013.01)

(56) References Cited

U.S. PATENT DOCUMENTS

| | | | | |
|---|---|---|---|---|
| 5,132,012 | A * | 7/1992 | Miura | G01N 30/6095 |
| | | | | 210/198.2 |
| 5,571,410 | A * | 11/1996 | Swedberg | G01N 30/6095 |
| | | | | 422/69 |
| 5,575,929 | A * | 11/1996 | Yu | G01N 30/6095 |
| | | | | 216/33 |
| 6,572,830 | B1 * | 6/2003 | Burdon | B01J 19/0093 |
| | | | | 422/129 |
| 6,702,256 | B2 * | 3/2004 | Killeen | F16K 99/0001 |
| | | | | 251/304 |
| 6,852,291 | B1 * | 2/2005 | Johnson | F16K 99/0001 |
| | | | | 137/625.46 |
| 6,958,119 | B2 * | 10/2005 | Yin | G01N 30/34 |
| | | | | 210/101 |
| 8,622,086 | B2 * | 1/2014 | Servin | F16K 99/0001 |
| | | | | 251/367 |
| 10,384,151 | B2 * | 8/2019 | Liu | G01N 30/20 |
| 10,427,155 | B2 * | 10/2019 | Aravanis | F16K 99/0013 |
| 10,527,192 | B2 * | 1/2020 | Cauley, III | F16K 11/0743 |
| 10,820,847 | B1 * | 11/2020 | Andeshmand | B01L 3/502761 |
| 10,866,218 | B2 * | 12/2020 | Gerhardt | G01N 30/38 |
| 11,054,054 | B2 * | 7/2021 | Liu | F16K 11/0743 |
| 2003/0015682 | A1 | 1/2003 | Killeen et al. | |
| 2004/0134546 | A1 * | 7/2004 | Schick | B01L 3/502738 |
| | | | | 137/625.46 |
| 2006/0202330 | A1 * | 9/2006 | Reinhardt | F16K 99/0001 |
| | | | | 257/737 |
| 2009/0145205 | A1 * | 6/2009 | Hochgraeber | G01N 35/1097 |
| | | | | 73/61.55 |
| 2019/0285322 | A1 | 9/2019 | Spieth et al. | |
| 2020/0064313 | A1 * | 2/2020 | Cormier | F16K 99/0028 |

* cited by examiner

MICROFLUIDIC COMPONENT WITH METAL LAYER STACK AND FLUID CONDUIT ELEMENT MADE OF ANOTHER MATERIAL BONDED WITH IT

RELATED APPLICATIONS

This application is the national stage under 35 U.S.C. 371 of International Application No. PCT/IB2021/055057, filed Jun. 9, 2021; which claims priority to German Application No. DE 10 2020 115 728.2, filed Jun. 15, 2020; the entire contents of each of which are incorporated by reference herein.

TECHNICAL FIELD

The present invention relates to a microfluidic component, a sample separation device, and a method for manufacturing a microfluidic component for a sample separation device.

BACKGROUND

In a high-performance liquid chromatography (HPLC) system, typically a liquid (mobile phase) with a very precisely controlled flow rate (for example in a range of microliters to milliliters per minute) and at a high pressure (typically 20 to 1000 bar and above, currently up to 2000 bar), where the compressibility of the liquid is noticeable, is moved through a so-called stationary phase (for example in a chromatographic column), to separate single components of a sample liquid which is introduced in the mobile phase from each other. For example, such a HPLC-system is known from EP 0,309,596 B1, of the same applicant, Agilent Technologies, Inc. Such a HPLC-system has frequently one or more switchable fluid valves.

Microfluidic components, such as components of fluid valves, are conventionally manufactured by pressing a, for example powdery, starting material in a molding tool to a desired shape.

However, the manufacture of fluid valves (in particular of rotor-and/or stator components of a fluid valve) and other microfluidic components for sample separation devices is still elaborate and prone to errors. A difficulty is that the microfluidic components for sample separation devices have to withstand high and highest pressures. Moreover, the microfluidic components which get in contact with a fluidic sample and solvents shall preferably be biologically and chemically inert.

Additionally, fluids shall be able to reliably flow through microfluidic structures of the microfluidic components. This is increasingly critical, when microfluidic structures of the microfluidic components become smaller and smaller. In this case, during a manufacturing process, it might occur that microfluidic channels or the like are undesirably closed, for example.

SUMMARY

It is an object of the present subject matter to manufacture a microfluidic component with microfluidic structures with an acceptable effort and a high error robustness during fabrication and operation.

According to an exemplary embodiment of the present invention, a microfluidic component for a sample separation device is provided, wherein the microfluidic component comprises a layer body with multiple metal layer structures which are connected to each other, and an element which is made of another material than the metal layer structures, comprises at least one microfluidic structure, and is bonded with the layer body.

According to another exemplary embodiment, a sample separation device for separating a fluidic sample is provided, wherein the sample separation device comprises a fluid drive for driving a mobile phase and the fluidic sample contained therein, a sample separation unit for separating the fluidic sample in the mobile phase, and a microfluidic component with the above described features, wherein the fluidic sample and/or the mobile phase is to be delivered through the at least one microfluidic structure during the separation.

According to a further exemplary embodiment, a method for manufacturing a microfluidic component for a sample separation device is provided, wherein the method comprises connecting multiple metal layer structures for forming a layer body, and bonding an element, which is made of another material than the metal layer structures and is formed with at least one microfluidic structure, with the layer body.

In the context of the present application, the term "microfluidic component" in particular denotes a component which makes a functional contribution in terms of a sample separation analysis, which encompasses conducting a fluid (in particular the fluidic sample to be separated and/or a mobile phase) through microfluidic structures of the component. Such a microfluidic component may be fluidically coupled via fluid conduits (for example capillaries) with one or more other microfluidic components. Examples for such microfluidic components are a fluidic valve which is switchable between different fluid coupling states, or a component of it, a sample separation unit for separating a fluidic sample or a component of it, a detector or a detector component for detecting the separated fluidic sample, a fluidic heat exchanger, a mixer for mixing fluids, etc.

In the context of the present application, the term "microfluidic structure" in particular denotes a branched or non-branched channel, a multiplicity of such channels, or another structure with dimensions in the range of micrometers to millimeters, through which a fluid can flow. According to an embodiment, an inner diameter of the at least one microfluidic structure may be in a range between 0.05 mm and 1 mm, in particular in a range between 0.1 mm and 0.5 mm. The microfluidic structures may comprise hollow spaces which are free from a solid material, or may be partially filled, for example with a stationary phase as a sample separation material.

In the context of the present application, the term "layer body" may in particular denote a body which comprises a multiplicity of preferably planar layers which are in particular arranged in parallel to each other and connected to each other, which, commonly with the element, form a common component, preferably made of one piece. The layer body comprises or consists of metal layer structures, may however optionally comprise also one or more dielectric layers.

In the context of the present application, the term "metal layer structure" may in particular denote a, in particular planar and flat, metallic structure which may be processed under formation of at least one microfluidic structure. A metal layer structure may comprise or consist of a metal (in particular an elementary metal). For example, a metal layer structure may be made of iron or stainless steel. A metal layer structure may be a continuous layer made of metal or may be a structured metal layer with one or more horizontally and/or vertically and/or inclinedly extending recesses. A metal layer structure may also be formed of multiple metallic islands which are arranged in a coplanar manner, which are not connected to each other.

In the context of the present application, the term "element made of another material than the metal layer structures" may in particular denote a body which has another material configuration than the metal layer structures. In particular, the element may be a foreign material element made of a material which is different from a layer body material. For example, the element may comprise or consist of a dielectric material. Exemplary materials for the element are ceramic or plastic. Thus, between the element and the layer body made of metal layer structures, a material bridge may be formed.

In the context of the present application, the term "sample separation device" may in particular denote a device which is capable and configured or configurable to analyze or to separate a fluidic sample, for example to separate into different fractions. For example, the sample separation may be performed by chromatography or electrophoresis. For example, the sample separation device may be a liquid chromatography sample separation device.

In the context of the present application, the term "fluidic sample" in particular denotes a medium which contains the matter which is actually to be analyzed (for example a biological sample, such as a protein solution, a pharmaceutical sample, etc.).

In the context of the present application, the term "mobile phase" in particular denotes a fluid (further in particular a liquid) which serves as a carrier medium for transporting the fluidic sample between a fluid drive and a sample separation unit. For example, the mobile phase may be a (for example organic and/or inorganic) solvent or a solvent composition (for example water and ethanol).

In the context of the present application, the term "fluid drive" may in particular denote a unit for delivering and moving a fluid, which may optionally bring the fluid to an elevated pressure. For example, such a fluid drive may be a pump, for example a single-stage or multi-stage piston pump. For example, the fluid drive may be configured as a chromatographic high pressure pump.

In the context of the present application, the term "sample separation unit" may in particular denote a component which is able to separate, in particular separate into fractions, a fluidic sample. For example, such a sample separation unit may comprise a stationary phase, at which the sample is adsorbed and, by a variation of a solvent composition (for example according to a gradient profile), is released and/or desorbed from the stationary phase in fractions. For example, a sample separation unit may be a chromatographic separation column.

According to an embodiment of the invention, a microfluidic component and a corresponding manufacturing method are provided, wherein a foreign material element which is provided with microfluidic structures is, preferably integrally, connected with metal layer structures of a layer body by bonding. It has turned out, that such a hybrid component with constituents formed of metallic and of another material shows a strong mechanical stability and therefore a high robustness under harsh operation conditions and pronounced fluidic force impact. Microfluidic structures of the component, in particular in the foreign material element, may be used with a high reliability and reproducibility for conducting a fluid during the operation of a sample separation device. Despite different material properties (in particular with respect to a heat extension) of metallic and other materials of the fluid component, it has turned out as practicable to manufacture a mechanically stable fluid component made of metal layer structures and a material-foreign element with respect to it, whose at least one microfluidic structure can be precisely fabricated and reliably withstands even a high pressure in an operation of the fluid component. With advantage, a component according to exemplary embodiments of the invention may be configured highly stable with respect to high pressures of up to 1000 bar and more, as they may occur in the chromatography, for example. Moreover, in particular the foreign material element may be formed biologically and chemically inert. Also smallest microfluidic structures, in particular in the foreign material element, have turned out as being non-sensitive to an undesired clogging or closing during a manufacturing process and in operation.

In the following, additional embodiments of the microfluidic component, the sample separation device, and the method are described.

According to an embodiment, the microfluidic component may be configured as a fluid valve or a component of a fluid valve, in particular as a rotor component or a stator component of a fluid valve. In the context of the present invention, the term "valve component" denotes a valve body which can be moved relatively to another valve component during a switching operation of the fluid valve. According to a preferred embodiment, the both valve components are a rotor unit and a stator unit of a fluidic valve. However, it is alternatively also possible to accomplish the switching of the fluid valve by a longitudinal motion between two cooperating valve components. A fluidic valve may be formed of two components which are movable relatively to each other, which, in the case of a rotor valve, include a rotating rotor component and a stator component which is to be kept stationary. In the stator component, ports for fluidically connecting the fluid valve to a fluidic environment may be formed (for example by fluid conduits, such as capillaries). Moreover, in the rotor component, fluidic coupling structures (such as grooves or channels) may be formed, which, in different switching states of the fluid valve, enable different fluidic coupling states or fluidic decoupling states between the ports. Also in the stator component, one or more such fluid conduits may be formed. The stator component and the rotor component may be assembled such that, by rotating the rotor component with respect to the stator component, the ports in the fluid channels can be brought in the different fluid coupling states. According to an exemplary embodiment, in particular the component can be advantageously manufactured as stator component, wherein microfluidic structures in the foreign body element and/or in the metal layer structures can form ports. Furthermore, a robust functional surface of the element with a high mechanical resistance and proper friction characteristics may be formed, which enable a cooperation with a rotor component even in case of high contact pressures. The layer body made of metal layer structures which, preferably integrally, adjoins the element, may also comprise microfluidic structures which can be fluidically coupled with the microfluidic structures of the element, and may serve as basis body of the component. It has turned out that a microfluidic component in form of a fluid valve or a component of it which is made as hybrid of metal layer structures and an element made of another material with a microfluidic structure fulfills high requirements to mechanical robustness, leak tightness, and reliable provision of a fluidic coupling function. Advantageously, it has turned out that, when bonding the multiple layer structures with the element, microfluidic structures which are already preformed in the element, despite the impact of pressure and temperature, can reliably be maintained (in particular remain open) during bonding.

According to another embodiment, the microfluidic component may be configured as one of a group which is consisting of a sample separation unit or a part of a sample separation unit, a sample enrichment unit (for example a Trap-column for enriching a fluidic sample), or a part of a sample enrichment unit, a heat exchanger, and a mixer.

In particular, the element may be placed on the layer body made of the metal layer structures for closing the component, as a plug or the like, and can suppress an undesired leakage of stationary phase in a sample separation unit, while, by the microfluidic structures in the foreign material element, a fluidic access to the stationary phase can be advantageously maintained. For example, the element may also be attached to a column entry and can optionally also function as a frit there. In a sample separation unit, a microfluidic component according to an exemplary embodiment of the invention may also be used for an external closing of packaging material of a stationary phase in a metal laminate chip for achieving a higher pressure resistance. Descriptively speaking, the component can be used as a fluid permeable plug or as a fluid permeable sieve for the stationary phase of a sample separation unit. In this way, by the element, the stationary phase can be prevented from leaving the component, in particular the layer body.

Moreover, in a sample separation unit, the microfluidic structures may serve for forming a heat exchanger function which is integrated in a wall of the sample separation unit. In another embodiment, such a heat exchanger may also be formed independently from a sample separation unit and may comprise meander-shaped or helical microfluidic structures, for example, through which a fluid can flow for accomplishing a heat exchange with another fluid.

In a fluidic mixer, one or more fluidic inlet flows are mixed with each other (for example at a fluidic T-point, Y-point, or X-point) and subsequently leave as a mixed fluid at an exit of the microfluidic structure. In particular, such a mixer can be purely passive, i.e. can be operated without movable parts. For example, fluidic obstacles in a fluid conduit and/or different fluid length paths through which different fluid portions flow and which are formed of microfluidic structures may be part of such a mixer.

According to an embodiment, the element may be embedded in the layer body or integrated in it. Hence, the foreign material element may be an inlay which is completely or partially integrated in the layer body. For example, a cavity may be formed in the layer body, in which the element may be placed and/or fitted. In particular, this may be performed under formation of a planar aligned exterior surface of the component, which is partially formed by the layer body and partially formed by the element. Embedding the element in the layer body further improves the intrinsic coherence of the component and protects the component from separating from the layer body and/or from mechanical influences.

According to an embodiment, the element may be embedded in the layer body with an undercut, in particular in a form-locking manner. In order to withstand even a high mechanical stress in the operation of the component (for example in a rotational switching operation of a fluid valve which contains the component or is made of it), the element and a receiving volume in the layer body can be formed with a shape which is substantially inverse with respect to each other, which enables a form-locking anchoring or engagement of the element and the layer body. When a longitudinal force or a rotational stress are acting upon the component, the element is especially reliably protected from an undesired separation or detachment from the layer body.

According to an embodiment, the element may be embedded in the layer body, such that a functional surface of the element is exposed. In this context, a functional surface may denote a surface of the element, at which the (in particular fluidic) function takes place in the operation of the component. When the component is formed as a part of a fluid valve, this functional surface may be a boundary surface of a stator component or a rotor component which adjoins a respectively corresponding boundary surface of another rotor component or stator component in operation. Embedding the element in the layer body while keeping the functional surface exposed combines a secure anchoring with an unlimited functionality of the element.

According to an embodiment, the functional surface of the element may be aligned with an exterior surface of the layer body. In other words, the functional surface and an adjoining exterior surface of the layer body may commonly form a planar end surface of the component. This predestines the component as stator component or rotor component of a fluid valve for cooperating with the corresponding rotor component or stator component.

According to an embodiment, at the exposed functional surface of the element, the at least one microfluidic structure may be accessible from the outside. For example, the exposed microfluidic structure at the exposed functional surface may be directly coupled with another microfluidic structure of another component which is functionally cooperating with the component. In an embodiment, exposed microfluidic structures are ports of a stator component of a fluid valve which can cooperate with exposed fluid channels (in particular grooves) at an opposing exposed functional surface of a rotor component of the fluid valve by a fluidic coupling.

According to an embodiment, at least one of the metal layer structures of the layer body may comprise at least one further microfluidic structure. Thus, the hybrid component made of a metallic and another material may also be configured to commonly form fluidically communicating microfluidic structures. It has surprisingly advantageously turned out that, during preferably thermally supported pressing of metal layer structures of the layer body, fluidic hollow spaces which are formed therein, despite the exerted pressure and/or the exerted thermal influence, remain open. Fluidic hollow spaces in the multi-layer structures may contain horizontal channels and/or vertical fluid connections.

According to an embodiment, the at least one microfluidic structure of the element may be fluidically coupled with the at least one further microfluidic structure of the layer body. Thus, with advantage, microfluidic structures of the metal layer structures of the layer body may be brought in fluid connection with the microfluidic structures of the element. In this way, also complex fluidic tasks may be realized by the hybrid component due to the further microfluidic structure of the layer body in cooperation with the element with its microfluidic structures.

According to an embodiment, the element may be a disk. In particular, the element may be configured as a stepped disk, which promotes its form-locking anchoring (preferably with an undercut) as inlay in the layer body. Such a disk, which may comprise protrusions (in particular for improving an anchoring effect with the layer body) in a horizontal plane and/or in a vertical direction (i.e. perpendicularly to and/or along a stacking direction of the multiple layer structures), is especially suitable for a position-specific embedding in the layer body under exposing a functional surface of the element.

According to an embodiment, an exposed functional surface of the element may comprise a lower roughness Ra than another exterior surface (or even as all other exterior surfaces) of the element. Roughness denotes the unevenness and/or the microscopic surface profile of the respective surface. The average roughness value indicates the average distance of a measuring point on the surface to a centerline. The centerline cuts the actual profile in the reference section, such that the sum of the profile deviations in a parallel plane to the centerline is distributed to the length of the measurement section. In particular, an exposed functional surface of the element may be selectively polished, to achieve the mentioned roughness. A functional surface of the element may be a surface, at which the component cooperates with another component, in particular in a direct physical contact. An example for functional surfaces are contact surfaces and abutting surfaces, respectively, of a stator component and a rotor component of a rotational fluid valve. Polishing the component may be selectively performed only at the functional surface of the element, where consequently a roughness (in particular measured in Ra) may be lower than at the rest of the element and/or at the rest of the entire component. A polished functional surface enables a sliding between a rotor component and a stator component of a fluid valve with a low friction, wherein the rotor component and/or the stator component may be formed by a component according to an embodiment of the invention.

With advantage, polishing a functional surface of the element may be performed prior to bonding the element with the layer body. This simplifies the manufacturing method, since in this way, selectively polishing a part of the surface of the component may be avoided, and it has turned out that the high surface quality of a previously polished functional surface remains during bonding.

According to an embodiment, the element may comprise a collar which is interrupted, in particular interrupted multiple times, in the circumferential direction. This has advantages: on the one hand, the interruptions may serve for balancing material displacements during bonding due to different heat expansions of the material of the metallic layer body and the element, when these materials are exposed to a heat input, for example during the manufacturing method (in particular bonding). This reduces inner thermal tensions in the component and ensures a reliable fluidic coupling between the microfluidic structures in the layer body and in the element. On the other hand, material portions between the interruptions may descriptively contribute to a mechanical anchoring between the layer body and the element. Thereby, a damage of the connection between the layer body and the foreign material element may be avoided, even in the case of strong shocks. Finally, the sequence of interruptions and material portions in the circumferential direction also serves for a specific relative positioning and relative orientation between the layer body and the element, whereby also a correct orientation between cooperating fluidic structures of the layer body and the element is promoted.

According to an embodiment, the element may comprise a circumferential collar which, at least in sections, comprises a compression ring which is directing in the direction of an exposed functional surface of the element. Such a compression ring may be enclosed by the layer body and the element in a form-locking manner during bonding, may in particular penetrate into one of the metal layer structures in a spine-like manner, and may thereby promote a mechanical integrity of the microfluidic component.

According to an embodiment, the element may extend over at least two metal layer structures of the layer body. An outer metal layer structure may radially cover an inner region of the layer body, whereas an outer region of the layer body may be tapering with respect to its inner region and may be exposed with respect to the outer metal layer structure. In this way, an external access of the microfluidic structure of the element and a secure anchoring of the element in the layer body may be combined. Both outermost metal layer structures may thus cooperate for securely embedding and externally exposing the element.

According to an embodiment, a metal layer structure which is adjoining the element at the bottom side may comprise at least one balancing recess (for example one or more grooves, for example annular grooves) for balancing thermal expansion phenomena during bonding. In particular due to different coefficients of thermal expansion of the metallic material of the metal layer structure and the other material of the element, at a bottom boundary surface of the element, strong mechanical tensions may occur during and after bonding, which may lead to undesired positioning errors. By providing initially unfilled balancing openings at the top side at the metal layer structure which is carrying the element, a material, in particular of the layer body, which is displaced by thermal expansion during the manufacture, may be received in the balancing openings during bonding, whereby positioning errors and inner tensions in the component may be avoided. The balancing openings may remain free from material also after bonding, to provide a sufficiently large buffer volume.

According to an embodiment, the metal layer structures may be made of stainless steel. Stainless steel has turned out as highly suitable both as material for connecting with other metal layer structures and for forming fluidic structures therein. In addition, stainless steel shows proper connecting properties with elements made of ceramic or the like. Moreover, stainless steel is sufficiently stainless and inert, to be able to conduct even aggressive biological and chemical substances in its interior.

According to an embodiment, the element may be a non-metallic element. In the context of the present application, the term "non-metallic element" may in particular denote a material which does not show the properties of elementary metal. In particular, a non-metallic element may be made of one or more materials which is or which are not all a metal. In particular, the non-metallic element may be made of ceramic or plastic, for example. Also when a ceramic (for example aluminum oxide) may comprise a metal (for example aluminum), such a ceramic in summary has non-metallic properties. The non-metallic element may thus indeed comprise metal compounds, however it is not formed of elementary metal. Hence, a non-metallic element may be an element which is not formed of an elementary metal.

According to an embodiment, the element may comprise or consist of ceramic. For example, the ceramic may comprise or consist of aluminum oxide and/or zirconium oxide. Aluminum oxide ($Al_2O_3$) has the special advantage of a high heat capacity. The use of zirconium oxide is especially advantageous, when a mechanically highly robust and less brittle material is required. Also combinations of the mentioned and/or other powdery ceramics are possible, for example to combine the different material properties. For such reasons, also ceramic powders (in particular which are to be pressed) with different particle sizes may be used. The mentioned ceramics are mechanically robust and polishable as well as inert and have turned out as properly connectable with metal layer structures.

According to another embodiment, the element may comprise or consist of plastic. For example, the plastic may comprise or consist of polyetherketones, such as PEEK (polyetherketone). Such plastics are highly temperature resistant and resistant with respect to almost all organic and inorganic chemicals. Furthermore, such plastics are suitable for forming microfluidic structures in their interior.

According to an embodiment, an inner diameter of the at least one microfluidic structure may be in a range between 0.05 mm and 1 mm, in particular in a range between 0.1 mm and 0.5 mm. In case of such dimensions, constricting or even completely blocking the microfluidic structures can be avoided. At the same time, these small structure sizes are suitable to manage the required low flow rates and limited fluid volumes of modern sample separation devices. Microfluidic structures of these dimensions are especially suitable for sample separation tasks, for example by chromatography.

According to an embodiment, the at least one microfluidic structure may comprise at least one of a group which is consisting of a fully circumferentially limited microfluidic channel and a microfluidic groove. In other words, the microfluidic structure may be a microfluidic hollow space in the element. The fluid can flow through such a hollow space as a lumen in the interior of the element. In this context, a groove in particular denotes a longitudinal trench-shaped indentation. In contrast to a groove, a channel is a fully circumferentially limited hollow space which may have a circular or rectangular cross section, for example. However, also other microfluidic structures are possible, for example pores in a porous volume portion of the element. Such microfluidic structures may be formed in the layer structure and/or in the element in the horizontal direction and/or as vertical fluidic connection structure.

According to an embodiment, the method may comprise connecting the multiple metal layer structures by heat supply and/or pressurizing. For example, the metal layer structures may at first be structured (for example by a lithography and etching method, by a laser treatment, and/or by mechanically drilling or milling) and may subsequently be laminated with each other. Thereby, the metal layer structures may build a connection which is an inseparable without destruction, without undesirably closing fluidic channels in its interior by laminating.

According to an embodiment, the method may comprise, prior to bonding, polishing a functional surface of the element which is exposed after bonding. A more complex polishing after forming the bonding connection between the element and the layer body may thereby be avoided, despite it may be performed in other embodiments.

According to an embodiment, in the method, bonding the metal layer structures and the element, as well as connecting the metal layer structures to each other, may be performed simultaneously, in particular by one common process. In particular, this may be accomplished by a common thermal treatment and/or pressure treatment. Therefore, the manufacture of the component is possible with a low effort.

According to an embodiment, the sample separation unit may be configured as a chromatographic separation unit, in particular as a chromatography separation column. In a chromatographic separation, the chromatography separation column may be provided with an adsorption medium. At this, the fluidic sample may be retained and may be only subsequently released again in fractions with enough eluent (isocratic) or in presence of a specific solvent composition (gradient), whereby the separation of the sample in its fractions is accomplished.

The sample separation device may be a microfluidic measuring device, a life science device, a liquid chromatography device, a HPLC (high-performance liquid chromatography) device, a UHPLC (ultra-high-performance liquid chromatography) device, a SFC supercritical liquid chromatography) device, a gas chromatography device, an electrochromatography device and/or a gel electrophoresis device. However, also other applications are possible.

For example, the fluid drive may be configured to deliver the mobile phase with a high pressure, for example some 100 bar up to 1000 bar and more, through the system.

The fluid separation device may comprise a sample injector for introducing the sample in the fluidic separation path. Such a sample injector may comprise an injection needle which is coupleable with a seat in a corresponding liquid path, wherein the needle may be extended out of this seat, to receive the sample, wherein after reintroducing the needle in the seat of the sample, the sample is located in a fluid path which, for example by switching a valve, can be switched in the separation path of the system, which leads to an introduction of the sample in the fluidic separation path.

The sample separation device may comprise a fraction collector for collecting the separated components. Such a fraction collector may guide the different components in different liquid containers, for example. However, the analyzed sample can also be supplied to a drain container.

Preferably, the sample separation device may comprise a detector for a detection of the separated components. Such a detector may generate a signal which can be observed and/or recorded, and which is indicative for the presence and the amount of the sample components in the fluid which is flowing through the system.

BRIEF DESCRIPTION OF THE DRAWINGS

Other objects and many of the accompanying advantages of embodiments of the present invention will be easily perceptible and better understandable under reference to the following detailed description of embodiments in connection with the enclosed drawings. Features which are substantially or functionally equal or similar are provided with the same reference signs.

Figure 1:
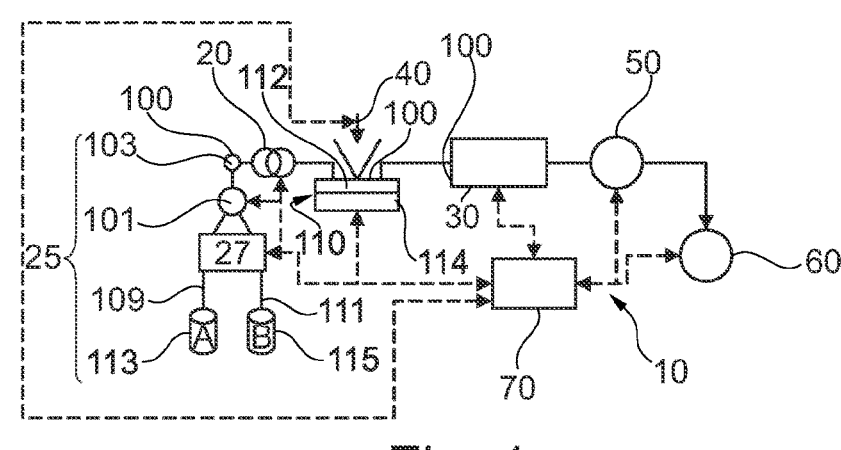
FIG. 1 shows a HPLC system as sample separation device with multiple microfluidic components according to an exemplary embodiment of the present disclosure.

The illustration in the drawings is schematic.

DETAILED DESCRIPTION

Before, referring to the drawing figures, exemplary embodiments are described, some basic considerations shall be summarized, based on which exemplary embodiments of the present disclosure have been derived According to an exemplary embodiment, a fluidic hybrid component made of connected metal layer structures (for example a stainless steel laminate) and an (preferably ceramic) element with a microfluidic structure (for example a fluid channel) which is bonded with it may be provided. With advantage, the at least one microfluidic structure may extend up to an exterior side of the component and may thus be fluidically coupled with another microfluidic structure for forming a, preferably high pressure tight, fluid connection.

According to a preferred embodiment, an element as ceramic inlay with a microfluidic structure may be glued or otherwise bonded at or in a layer body (which is preferably formed as a metal laminate), to thereby form a component of a microfluidic shear valve, for example. The component may be configured as a metal-micro-fluidic-component. The microfluidics concerns the behavior of liquids and gases in smallest space which may substantially differ from the behavior of macroscopic fluids, since in this order of magnitude, effects may dominate, which can be neglected in macroscopic dimensions. Such a microfluidic component may be manufactured on the basis of metal structures which may be manufactured of stainless steel foils by thermal bonding at a high pressure and a high temperature. Caused by such a manufacturing process, the material properties of a microfluidic component may correspond to a soft annealed condition. Such metallic surfaces taken alone are unsuitable as functional surface for a rotary shear valve. In an advantageous manner, according to an exemplary embodiment of the present disclosure, a functional surface of a microfluidic component with hard, polished, and low wear properties may thus be formed by using a co-bonded element, preferably a ceramic part. Such hybrid-type microfluidic components according to exemplary embodiments of the present disclosure may be used in an advantageous manner as a rotary shear valve stator, for example. Conventional valves of this type are usually milled from a solid and enable-due to this manufacturing process—only a limited complexity.

Rotary valves may comprise a stationary, disk-type part (also denoted as stator). This static and frequently disk-shaped part may comprise fluidic ports to other components (for example a fluid drive, a sample separation unit, an injector, a detector, etc.) on one side of the disk. On the opposite side, for example circularly arranged channel openings may be located, on which another disk-type part (also denoted as rotor) is pushed and selectively closes, connects, or opens these openings. For applications in the high pressure field (in particular in HPLC), the rotor is to be pushed on the stator with a high force, for this reason, this shall comprise a high resistance to wear by friction. This can be achieved by a component according to an exemplary embodiment of the present disclosure, which connects metal layer structures, which are connected to each other, with an integrally connected element, preferably made of ceramic, with microstructures.

FIG. 1 shows the basic structure of a HPLC system as example for a liquid chromatography sample separation device 10 according to an exemplary embodiment of the present disclosure, as it may be used for a liquid chromatography, for example.

In the illustrated sample separation device 10, a fluid drive 20, which is supplied with solvents from a supply unit 25, drives a mobile phase through a sample separation unit 30 (such as a chromatographic column) which includes a stationary phase. The supply unit 25 encompasses a first fluid component source 113 for providing a first fluid and/or a first solvent component A (for example water), and a second fluid component source 115 for providing another second fluid and/or a second solvent component B (for example an organic solvent). An optional degasser 27 may degas the solvents which are provided by the first fluid component source 113 and by the second fluid component source 115, before these are supplied to the fluid drive 20. A sample insertion unit 40 which may also be denoted as injector, is arranged between the fluid drive 20 and the sample separation unit 30, to introduce a sample liquid or fluidic sample in the fluidic separation path. For this purpose, an injector valve 110 may be correspondingly switched. The injector valve 110 may be configured as rotary shear valve which comprises a stationary stator component 112 and a rotatable rotor component 114 which is controlled by a control unit 70. For example, the stator component 112 may comprise microfluidic structures in form of ports which may be fluidically connected to the diverse components 20, 40 and/or 30, etc., and which may extend up to a contact surface with the rotor component 114. For example, the rotor component 114 has one or more grooves at the contact surface, i.e. trench-shaped indentations which, depending on a current relative orientation between the stator component 112 and the rotor component 114, may selectively form or not form fluidic connections between respective ones of the ports.

The stationary phase of the sample separation unit 30 is provided for separating the components of the sample. A detector 50 which may comprise a flow cell detects separated components of the sample, and a fractionizing device 60 may be provided for eluting separated components of the sample in containers which are provided for this purpose. Liquids which are not required anymore may be eluted in a drain container and a waste (not shown), respectively.

While a liquid path between the fluid drive 20 and the sample separation unit 30 is typically under pressure, the sample liquid is at first introduced under standard pressure in a region which is separated from the liquid path, a so-called sample loop, of the sample insertion unit 40 and/or of the injector, which then in turn introduces the sample liquid in the liquid path which is under high pressure. During connecting the sample liquid which is at first under standard pressure in the sample loop with the liquid path which is under high pressure, the content of the sample loop is brought to the system pressure of the sample separation device 10 which is configured as HPLC. A control unit 70 controls the single components 20, 27, 30, 40, 50, 60, 110, and a proportioning unit 101 of the sample separation device 10.

Other components of the sample separation device 10 upstream the sample insertion unit 40 in FIG. 1 serve for providing a mixture of multiple different fluids as solvent composition and mobile phase, respectively, for the liquid chromatography sample separation device 10. Two supply conduits 109, 111 are fluidically coupled with a respective one of the two solvent containers which are denoted as fluid component sources 113, 115, for providing a respective one of the fluids and/or solvent components A and B. The respective fluid and/or the respective solvent component A and/or B is delivered through the respective supply conduit 109 and 111, respectively, through the degasser 27, to a fluid valve as proportioning unit 101, at which the fluids and/or solvent components A and/or B from the supply conduits 109, 111 are combined with each other. Thus, at the proportioning unit 101, the fluid packages from the supply conduits 109, 111 flow together under formation of a solvent composition. The latter is supplied to the fluid drive 20 after passing through a mixer 103 for mixing the single solvent components.

One or more of the components of the sample separation device 10 according to FIG. 1 may be constructed as a microfluidic component 100 according to an exemplary embodiment of the present disclosure. According to FIG. 1, as illustrated with the respective reference sign 100, these are a stator component 112 (see FIG. 2 to FIG. 5) and/or a rotor component 114 of the fluid valve 110, such as a column entry of the sample separation device 30 (see FIG. 6) and the mixer 103. Each of these microfluidic components 100 comprises a layer body with multiple metal layer structures which are connected with each other, and an element which is made of another material, which comprises microfluidic structures and is bonded with the layer body.

Figure 2:
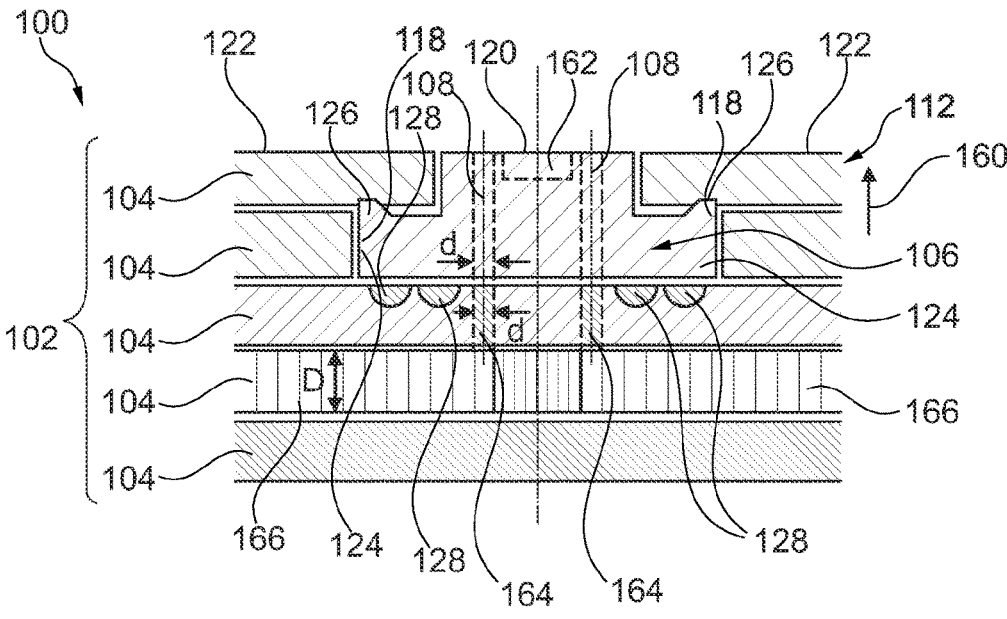
FIG. 2 shows a cross-sectional view of a stator component as microfluidic component according to an exemplary embodiment of the present disclosure of a rotary fluid valve.
Figures 3, 4:
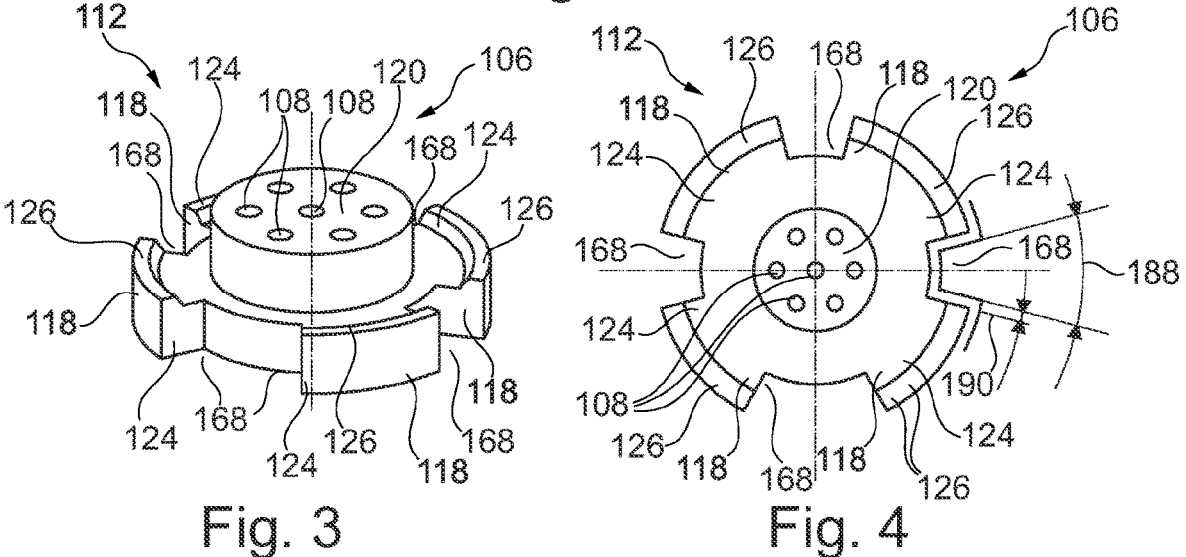
FIG. 3 shows a spatial view of a ceramic inlay element of the stator component of the microfluidic component according to FIG. 2.
FIG. 4 shows a plan view of the ceramic inlay element of the stator component of the microfluidic component according to FIG. 3.

Exemplary embodiments of microfluidic components 100 are described in the following:

FIG. 2 shows a cross-sectional view of a stator component 112 of a fluid valve 110 as microfluidic component 100 according to an exemplary embodiment of the present disclosure. FIG. 3 shows a spatial view of a ceramic element 106 of the stator component 112 of the microfluidic component 100 according to FIG. 2. FIG. 4 shows a plan view of the element 106 of the stator component 112 according to FIG. 2 and FIG. 3.

Thus, FIG. 2 to FIG. 4 show components of a stator component 112 of a fluid valve 110 as example for a microfluidic component 100 for a sample separation device 10, such as that one which is shown in FIG. 1. In other words, the component 100 according to FIG. 2 to FIG. 4 is configured as a stator component 112 of a rotary shear valve or fluid valve 110. The shown microfluidic component 100 comprises a layer body 102 made of multiple metal layer structures 104 which are connected with each other and arranged in parallel to each other. The metal layer structures 104 may be made of an inert stainless steel or of other metal foils or metal layers, for example. The metal layer structures 104 may comprise void spaces or hollow spaces (see the uppermost four metal layer structures 104 according to FIG. 2) and/or may be continuous or uninterrupted metal layers (see the lowermost metal layer structure 104 according to FIG. 2). In the illustrated embodiment, five metal layer structures 104, which are planar and arranged in parallel to each other, are connected with each other, wherein alternatively any other number of metal layer structures 104 is possible. In both of the uppermost metal layer structures 104, a cavity or receiving opening for receiving an embedded element 106 as inlay is recessed. This element 106 may be made of another material than the metal layer structures 104. In particular, the element 106 may be non-metallic, i.e. may not consist of elementary metal. According to FIG. 2, the embedded non-metallic element 106 extends over both uppermost metal layer structures 104 of the layer body 102 and lies with its bottom surface on the third lowest metal layer structure 104. The non-metallic element 106 is preferably made of a ceramic material, for example aluminum oxide or zirconium oxide. Furthermore, the non-metallic or unmetallic element 106 comprises fluid channels as microfluidic structures 108, which extend vertically according to FIG. 2. The ceramic element 106 is bonded, for example glued and/or thermally bonded, with the metallic layer body

102 to form an integral component 100. By bonding, for example by supplying thermal energy and/or by pressurizing with mechanical pressure, a firm and permanent connection between the non-metallic element 106 and the layer body 102 is formed. Alternatively or additionally, such a connection may be accomplished by an adhesive. Hence, for manufacturing the microfluidic component 100, the multiple metal layer structures 104 may be connected with each other for forming the layer body 102, and the non-metallic element 106 with its microfluidic structures 108 may be bonded with the layer body 102.

As can be seen in FIG. 2, the non-metallic element 106 is embedded in the layer body 102, so that a functional surface 120 of the non-metallic element 106 is aligned with, or is oriented with, or is in flush with an outer surface 122 of the outermost metal layer structure 104. Thus, as can be seen in FIG. 2, the functional surface 120 of the non-metallic element 106 is aligned with the outer surface 122 of the layer body 102 under formation of a planar exterior surface of the component 100. The exposed functional surface 120 of the non-metallic element 106 may be polished, to be rotated with respect to the rotor component 114 with low friction and with low wear, despite a high pressure tight and fluid tight mechanical contact with a corresponding functional surface of a rotor component 114. With advantage, polishing the functional surface 120 prior to embedding the element 106 in the layer body 102 may be performed, to avoid an indeed possible, but elaborate polishing after bonding. Moreover, the non-metallic element 106 is embedded in both of the outermost metal layer structures 104 of the layer body 102 with an undercut 118, so that a form lock with the layer body 102 is formed, which makes it impossible to pull the element 106 out of the layer body 102. Even when larger forces are acting, due to this form lock or undercut 118, an undesired release of the non-metallic element 106 out of the layer body 102 may be reliably prevented. For manufacturing the component 100, the for example pre-pressed, pre-fired, and/or pre-processed, ceramic part in form of the element 106 may be laid on the three lowermost metal layer structures 104. In more detail, the element 106 with its widened bottom side may be inserted in a recess of the, according to FIG. 2 second, metal layer structure 104 from above. According to FIG. 2, a narrower upper side of the element 106 may be inserted in a smaller recess of the uppermost metal layer structure 104, so that the exterior side 122 of the outermost metal layer structure 104 is flush with the functional surface 120 at the top side of the element 106. Afterwards, a connection of the mentioned constituents with each other may be performed. In this way, the non-metallic element 106 may be embedded in the layer body 102, so that the functional surface 120 of the non-metallic element 106 is exposed, and so that at the same time the hybrid component 100, even when higher forces are acting in the operation of the fluid valve 110, is protected from an undesired separation of its parts.

As also shown in FIG. 2, at the exposed functional surface 120 of the non-metallic element 106, the microfluidic structures 108 of the element 106, which extend vertically here, are accessible from the outside. In the illustrated embodiment, the microfluidic structures 108 are formed as fluid channels which extend along a stack direction 160 of the planar stacked metal layer structures 104, and vertically according to FIG. 2. These vertically extending ports, at an exterior surface of the component 100 which is not shown in FIG. 2, may be fluidically coupled with other fluidic components of the sample separation device 10, for example with a fluid drive 20, a sample separation unit 30, or a sample insertion unit 40 (see FIG. 1). As schematically illustrated in FIG. 2 with the reference sign 162, it is also possible to form microfluidic structures in form of grooves in the functional surface 120. However, such (for example curved) grooves are preferably formed in a functional surface of a rotor component 114 of the fluid valves 110 which is in direct contact with the functional surface 120 of the stator component 112 in operation, to form fluidic connections with the ports or not in a selective manner, depending on a rotational state of the rotor component 114 relative to the stator component 112. In this way, the parts of the sample separation device 10, which are connected to the ports, may be fluidically coupled with each other or decoupled from each other in a selective manner.

FIG. 2 further shows that the metal layer structure 104 of the layer body 102, which is directly adjoining the element 106 at the bottom side, comprises further microfluidic structures 164 which are fluidically coupled with the microfluidic structures 108 of the element 106 and which also extend in the vertical direction according to FIG. 2. According to FIG. 2, the further microfluidic structures 164 and the microfluidic structures 108 are coaxially arranged to each other and are directly connected to each other. For example, an inner diameter d of the microfluidic structures 108 and 164 may be in a range between 0.1 mm and 0.5 mm. Moreover, the metal layer structure 104 which is the second lowest according to FIG. 2, comprises additional microfluidic structures 166 in form of horizontal fluid channels, each of which is brought in fluid connection with a respective one of the further microfluidic structures 164. The microfluidic structures 166 may comprise a vertical thickness D which corresponds to the thickness D of the associated metal layer structure 104. For example, the thickness D may be in a range between 0.3 mm and 3 mm, in particular in a range between 0.5 mm and 2 mm. The microfluidic structures 166 may be laterally limited by material of the corresponding metal layer structure 104, on the top side and at the bottom side by material of the metal layer structures 104 which are arranged above and below.

Hence, by the microfluidic structures 108 of the non-metallic element 106 being fluidically coupled with the further microfluidic structures 164, 166 of the layer body 102, a continuous fluidic connection between multiple different parts of a sample separation device 10 at an outer side of the component via one of the microfluidic structures 166, one of the microfluidic structures 164, one of the microfluidic structures 108 of a fluidic connection conduit (for example a groove) in the rotor component 114, another one of the microfluidic structures 108, another one of the microfluidic structures 164, and another one of the microfluidic structures 166 can be formed.

As shown in FIG. 2, FIG. 3, and FIG. 4, the ceramic element 106 may be configured as a stepped disk with a radially extended lower disk portion and a radially reduced or constricted upper disk portion which is arranged above it. In more detail, as can be seen best in FIG. 3 and FIG. 4, the non-metallic element 106 may comprise a collar 124 which is interrupted in the circumferential direction four times (or at more or less positions). Between respectively neighboring portions of the collar 124, a respective slit 168 is located. Different slits 168 may have different sizes, to ensure a correct mounting of the element 106 to the metal layer structures 104. By the tangentially alternating arrangement of the collar portions and the slits 168 arranged in between, a correct positioning between the element 106 and the metal layer structures 104 may be ensured. The slit 168 also serves for a compensation of thermally induced shrinking when connecting or bonding the element 106 and/or the metal layer structures 104 with each other. The reference sign 188 denotes a heat shrinking compensation region and the reference sign 190 denotes a constant slit during a bonding run.

The collar 124 which extends radially and is interrupted multiple times has a compression ring 126 at four (or more or less) portions which is pointing in the direction of the functional surface 120 of the element 106 which is exposed in the mounted state, and which compression ring 126 is interrupted multiple times in the illustrated embodiment, which is formed in form of four (or more or less) bar-type protrusions according to FIG. 3 and FIG. 4. The compression ring 126 serves for reliably enclosing the element 106 in the layer body 102 during bonding. Descriptively, the protrusions of the compression ring 126 which are pointing upwardly may penetrate in the metal layer structure 104 which is arranged above it in a spine-like manner, when the constituents of the component 100 are connected (in particular pressed) with each other.

The, according to FIG. 2 third uppermost, metal layer structure 104 which is adjoining the element 106 at the bottom side, comprises balancing recesses 128 at its top side for balancing thermal expansion phenomena during bonding. The ceramic material of the element 106 on the one hand and the metallic material of the metal layer structures 104 on the other hand have different coefficients of thermal expansion. Therefore, during the thermal bonding, thermal tensions may occur in the interior of the component 100, in particular in the boundary region between the element 106 and the layer body 102, which may also lead to a damage and positioning problems between the microfluidic structures 108, 164, 166. In order to avoid such undesired phenomena, the balancing recesses 128 may be formed at a material interface between the element 106 and the layer body 102 for receiving excessive material during the thermal expansion when manufacturing the component 100. It is especially advantageous to provide the balancing recesses 128 adjoining a fluid interface between the microfluidic structures 108 and 164, to ensure the fluidic coupling there, despite the thermal expansion.

Thus, FIG. 2 to FIG. 4 show a component 100 which can be used in a fluid valve 110 as a stator component 112 and which is configured as metal microfluidic (MMF) structure. The layer body 102 which is formed of laminated metal foils may be realized with an improved wear resistance by configuring a mechanically especially loaded region (see functional surface 120) with the microfluidic structures 108, which are formed as channels, as ceramic inlay. The hybrid component 100 made of laminated metal layers and the ceramic inlay comprises in particular the following advantageous characteristics:

As material for the non-metallic element 106, a ceramic with a composition may be used which does not lose its properties by the bonding process for connecting with the layer structure 102 made of metal. Suitable ceramic materials are aluminum oxide or zirconium oxide, for example.

According to FIG. 2 to FIG. 4, the ceramic inlay in form of the non-metallic element 106 is configured as a round disk with a readily polished functional surface 120, from which the channels in form of the microfluidic structures 108 exit and are therefore accessible for a fluidic connection. A polishing process after a performed bonding is thereby advantageously avoided, whereby an undesired ingress of dirt in the MMF structure of the layer body 102 is dispensable. In particular, in this case also the microfluidic channels 108 are effectively protected against such an ingress of dirt after bonding.

The ceramic material of the element 106 on the one hand and the metallic material of the layer body 102 on the other hand have different thermal expansions which may be moderated in an advantageous manner by constructive measures, to keep the ceramic inlay in form of the element 106 precisely placed during the bonding process. The element 106 comprises four wedge-type grooves for this purpose. Via the flank of the associated wedges, a positioning between the element 106 and the metal layer structures 104 is performed. Advantageously, the wedge angle may be configured so that the slit dimensions do not change or change only as low as possible in the case of a different heat expansion.

A bonding connection between the ceramic of the element 106 on the one hand and the metal of the layer body 102 on the other hand is sensitive to pulsed loads due to different elasticities and stiffnesses. To prevent a damage or even a destruction of the connection between the element 106 and the layer body 102 in case of strong impacts or other mechanical influences in operation, the element 106 may be advantageously enclosed by a surrounding collar 124 in the bonding structure of the surrounding metal layer structures 104. To form this connection in a form-locking manner, this surrounding collar 124 may preferably comprise a compression ring 126 which may be reliably enclosed during bonding by the, according to FIG. 2 uppermost or outermost, metal structure 104.

Moreover, the ceramic part in form of the element 106 may be tolerated thicker than the metal foils which correspond to both uppermost metal layer structures 104 according to FIG. 2. Thereby, a secure pressing can be ensured in an advantageous manner. To absorb tolerances, in a central metal layer structure 104 which is to be denoted as a cover layer, according to FIG. 2 directly underneath the ceramic inlay, reservoir hollow spaces in form of the balancing recesses 128 may be formed. During the bonding process, material from this metal layer structure 104 can be displaced into these, to avoid thermal tensions and positioning errors.

Corresponding to their functions, the metal layer structures 104 according to FIG. 2, from the top to the bottom, may be denoted as uppermost layer, spacer layer, sealing layer, channel layer, and lowermost layer.

Figure 5:
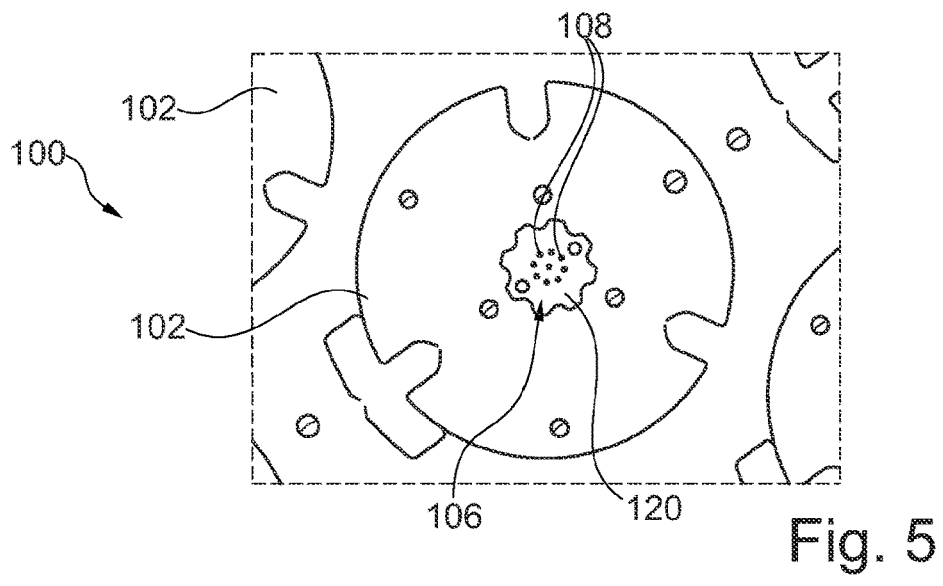
FIG. 5 shows a plan view of an actually manufactured stator component as microfluidic component according to an exemplary embodiment of the present disclosure.

FIG. 5 shows a plan view of an actually manufactured stator component 112 for a fluid valve 110 as microfluidic component 100 according to an exemplary embodiment of the present disclosure. FIG. 5 shows the result of bonding a ceramic inlay as non-metallic element 106 in a MMF structure which forms a metallic layer body 102.

Figure 6:
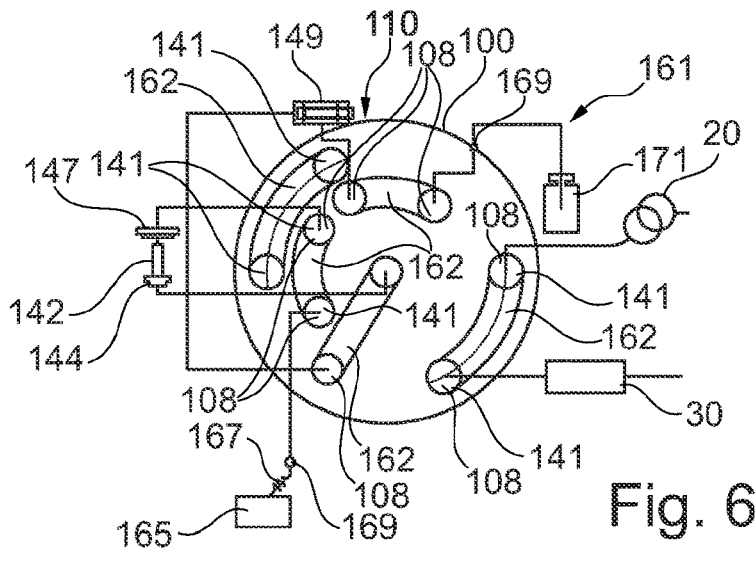
FIG. 6 shows a fluid processing device with a fluid valve as microfluidic component according to an exemplary embodiment of the present disclosure.

FIG. 6 shows a fluid processing device 161 with a fluid valve 110 as component 100 according to an exemplary embodiment of the present disclosure.

A needle 142 is arranged in a seat 144 and may be extended out of it (not shown), to draw-in the fluidic sample from a sample container (not shown) and, after retracting in the seat 144, to inject it via the fluid valve 110 in a fluidic path between a fluid drive 20 and a sample separation unit 30. When drawing-in the sample through the needle 142, the sample may be temporarily stored in a buffer volume 147, a so-called sample loop. Drawing-in the sample may be accomplished by a metering pump 149. A piston of the same may be retracted in a piston chamber for drawing-in, and may be displaced forwardly for injecting. Furthermore, a waste 165, a fluidic conduit 167, non-return valves 169, and a liquid container 171 are shown in FIG. 5. To operate the fluid processing device 161, the fluid valve 110 is provided with grooves 162 and ports 141 as fluid ports, which may be arranged in the rotor unit 114 and/or the stator unit 112 on different levels.

A stator component 112 of the fluid valve 110 according to FIG. 6 may be configured in correspondence with FIG. 2 to FIG. 5, for example.

Figure 7:
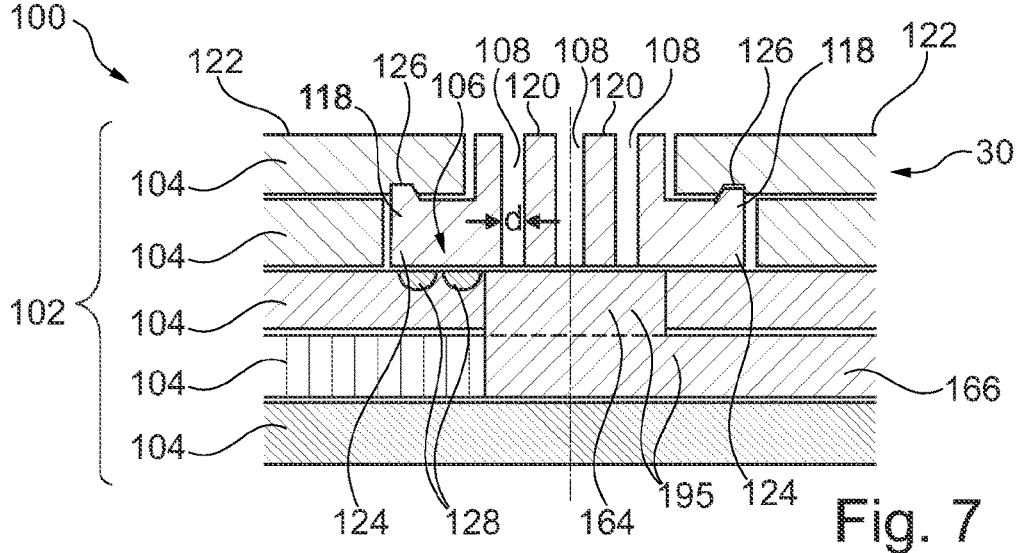
FIG. 7 shows a cross-sectional view of a sample separation unit as microfluidic component according to another exemplary embodiment of the present disclosure.

FIG. 7 shows a cross-sectional view of a sample separation unit 30 as microfluidic component 100 according to another exemplary embodiment of the present disclosure.

The component 100 according to FIG. 7 differs from the component 100 according to FIG. 2 substantially by the fact that, according to FIG. 7, all microfluidic structures 108 of the element 106 are permanently coupled with the microfluidic structures 164 and 166. Furthermore, according to FIG. 7, the microfluidic structures 164, 166 are filled with a stationary phase 195 of the sample separation unit 30, for example beads of a packaging material of the separation column, at which the actual separation of the fluidic sample is performed. Thus, the element 106 according to FIG. 7 is configured as a liquid permeable plug or sieve and/or as an end piece which allows fluid to flow through the microfluidic structures 108, but is impermeable for the particles of the stationary phase 195. Thus, the ceramic element 104 prevents the stationary phase 195 against undesirably leaving the sample separation unit 30, for example when pressure impacts during switching occur or by a mechanical stress or the like.

Alternatively to the configuration of the component 100 according to FIG. 7 as sample separation unit 30, i.e. as chromatography separation column, the component according to FIG. 7 may also be used as Trap-column, for example, which does not serve for sample separation, but for enriching a fluidic sample.

It should be noted that the term "comprising" does not exclude other elements, and the term "a" does not exclude a multiplicity. Also, elements which are described in connection with different embodiments, may be combined. It should also be noted that reference signs in the claims are not to be construed as limiting the scope of protection of the claims.

The invention claimed is:

1. A microfluidic component for a sample separation device, the microfluidic component comprising:
    a layer body comprising a plurality of metal layer structures connected to each other; and
    an element having a material composition different from a material composition of the metal layer structures, wherein the element comprises at least one microfluidic structure and is bonded with the layer body,
    wherein the layer body has a cavity and the element is disposed in the cavity such that the element is embedded in the layer body.

2. The microfluidic component according to claim 1, wherein the microfluidic component is selected from the group consisting of: a fluid valve; a component of a fluid valve; a stator component of a fluid valve; a rotor component of a fluid valve; a sample separation unit; a part of a sample separation unit; a sample enrichment unit; a part of a sample enrichment unit; a heat exchanger; and a mixer.

3. The microfluidic component according to claim 1, wherein the element comprises an undercut disposed in the cavity under at least one of the metal layer structures.

4. The microfluidic component according to claim 1, wherein the element is embedded in the layer body such that the element comprises an exposed functional surface that is exposed to a region outside of the microfluidic component.

5. The microfluidic component according to claim 4, comprising at least one of the following features:

wherein the exposed functional surface of the element is aligned with an exterior surface of the layer body;

wherein, at the exposed functional surface of the element, the at least one microfluidic structure is accessible from the region outside of the microfluidic component.

6. The microfluidic component according to claim 1, comprising one of the following features:

wherein at least one of the metal layer structures of the layer body comprises at least one further microfluidic structure;

wherein at least one of the metal layer structures of the layer body comprises at least one further microfluidic structure fluidically coupled with the at least one microfluidic structure of the element.

7. The microfluidic component according to claim 1, wherein the element is a disk or a stepped disk.

8. The microfluidic component according to claim 4, wherein the exposed functional surface of the element comprises a lower roughness Ra than another exterior surface of the element.

9. A microfluidic component for a sample separation device, the microfluidic component comprising:

a layer body comprising a plurality of metal layer structures connected to each other; and an element having a material composition different from a material composition of the metal layer structures, wherein the element comprises at least one microfluidic structure and is bonded with the layer body, wherein the element further comprises a collar that is interrupted in a circumferential direction around the collar.

10. A microfluidic component for a sample separation device, the microfluidic component comprising:

a layer body comprising a plurality of metal layer structures connected to each other; and an element having a material composition different from a material composition of the metal layer structures, wherein the element comprises at least one microfluidic structure and is bonded with the layer body, and wherein:

the element further comprises an exposed functional surface that is exposed to a region outside of the microfluidic component; and the element further comprises a circumferential collar which, at least in portions of the circumferential collar, comprises a compression ring protruding in a direction toward the exposed functional surface of the element.

11. The microfluidic component according to claim 1, wherein the element is disposed in the cavity such that the element is surrounded by at least two metal layer structures of the plurality of metal layer structures.

12. The microfluidic component according to claim 1, wherein the element comprises a bottom side, the plurality of metal layer structures comprises an adjoining metal layer structure that adjoins the bottom side of the element, and the adjoining metal layer structure comprises at least one balancing recess configured to balance thermal expansion phenomena during bonding due to different coefficients of thermal expansion of the element and the metal layer structures.

13. A sample separation device for separating a fluidic sample, the sample separation device comprising:

a fluid drive configured to drive a mobile phase and the fluidic sample contained therein;

a sample separation unit configured to separate the fluidic sample in the mobile phase; and the microfluidic component according to claim 1, wherein the fluidic sample and/or the mobile phase is to be delivered through the at least one microfluidic structure during the separation.

14. The sample separation device according to claim 13, further comprising at least one of the following features:

the sample separation unit is configured as a chromatographic separation unit;

the sample separation device is configured for analyzing at least one physical, chemical and/or biological parameter of at least one fraction of the fluidic sample;

the sample separation device comprises a device selected from the group consisting of: a device for a chemical, biological and/or pharmaceutical analysis; a chromatography device; a liquid chromatography device; a gas chromatography device; a device for supercritical liquid chromatography; a high-pressure liquid chromatography device; an ultra-high-pressure liquid chromatography device; an electrophoresis device; and a gel electrophoresis device;

the fluid drive is configured to drive the mobile phase with a pressure of at least 100 bar;

the fluid drive is configured to drive the mobile phase with a pressure of at least 500 bar;

the fluid drive is configured to drive the mobile phase with a pressure of at least 1000 bar;

the sample separation device is configured as a microfluidic device;

the sample separation device is configured as a nanofluidic device;

the sample separation device comprises a sample insertion unit configured to insert the fluidic sample into a fluidic path between the fluid drive and the sample separation unit;

the sample separation device comprises a detector for detecting the separated fluidic sample;

the sample separation device comprises a sample fractionator configured to fractionize the separated fluidic sample.

15. The microfluidic component according to claim 1, wherein the at least one microfluidic structure comprises a feature selected from the group consisting of:

a structure configured to conduct fluid through the structure;

a structure configured to conduct fluid through the structure and at least partially filled with a stationary phase;

a structure configured to conduct fluid through the structure and having an inner diameter in a range between 0.05 mm and 1 mm;

a structure configured to conduct fluid through the structure and having an inner diameter in a range between 0.1 mm and 0.5 mm;

a fully circumferentially limited channel; and a groove.

16. The microfluidic component according to claim 1, wherein the metal layer structures are composed of stainless steel or iron.

17. The microfluidic component according to claim 1, wherein the element comprises a material selected from the group consisting of: a non-metallic material; a ceramic; aluminum oxide; and zirconium oxide.

* * * * *